United States Patent
Toussaint

[11] 3,976,760
[45] Aug. 24, 1976

[54] CONTINUOUSLY PRODUCING AND RECOVERING METALLIC CHLORIDES

[75] Inventor: Henry Toussaint, La Varenne Saint Hilaire, France

[73] Assignee: Le Nickel, Paris, France

[22] Filed: Jan. 22, 1974

[21] Appl. No.: 435,513

[52] U.S. Cl. .............................. 423/493; 423/149; 423/568; 423/495; 75/112
[51] Int. Cl.² .................. C01G 53/08; C01G 51/08; C01B 17/06; C01B 49/10
[58] Field of Search ..................... 75/111, 113, 112; 423/149, 568, 493, 44; 55/72, 73, 83, 89

[56] References Cited
UNITED STATES PATENTS

| | | | |
|---|---|---|---|
| 1,414,491 | 5/1922 | Welch | 75/113 |
| 1,671,003 | 5/1928 | Bagsar | 75/113 |
| 2,675,889 | 4/1954 | Frey | 55/83 |
| 3,793,431 | 2/1974 | Gundzik | 423/568 X |

Primary Examiner—Oscar R. Vertiz
Assistant Examiner—Brian E. Hearn
Attorney, Agent, or Firm—Fleit & Jacobson

[57] ABSTRACT

A method is provided of continuously producing and recovering metallic chlorides. The method comprises melting an impure nickel matte in a melting zone, removing the melted product from the bottom of the melting zone, conveying the melted product to a separate chlorination zone sealed from the atmosphere, continuously injecting gaseous chlorine into the melted product in the chlorination zone, maintaining the melted product in the chlorination zone at a temperature such that at least one metal chloride is produced in the vapor phase, discharging the at least one metal chloride into a condensation zone, diluting and cooling the at least one metal chloride in the condensation zone in a continuous flow of cooling gas consisting of sulphur vapor at a temperature and rate of flow such that the temperature is lower than the melting point of the at least one metal chloride and the at least one metal chloride is thereby condensed, collecting the condensed metal chloride and continuously cooling and recycling the cooling gas to dilute and cool further quantities of chloride vapor.

3 Claims, 1 Drawing Figure

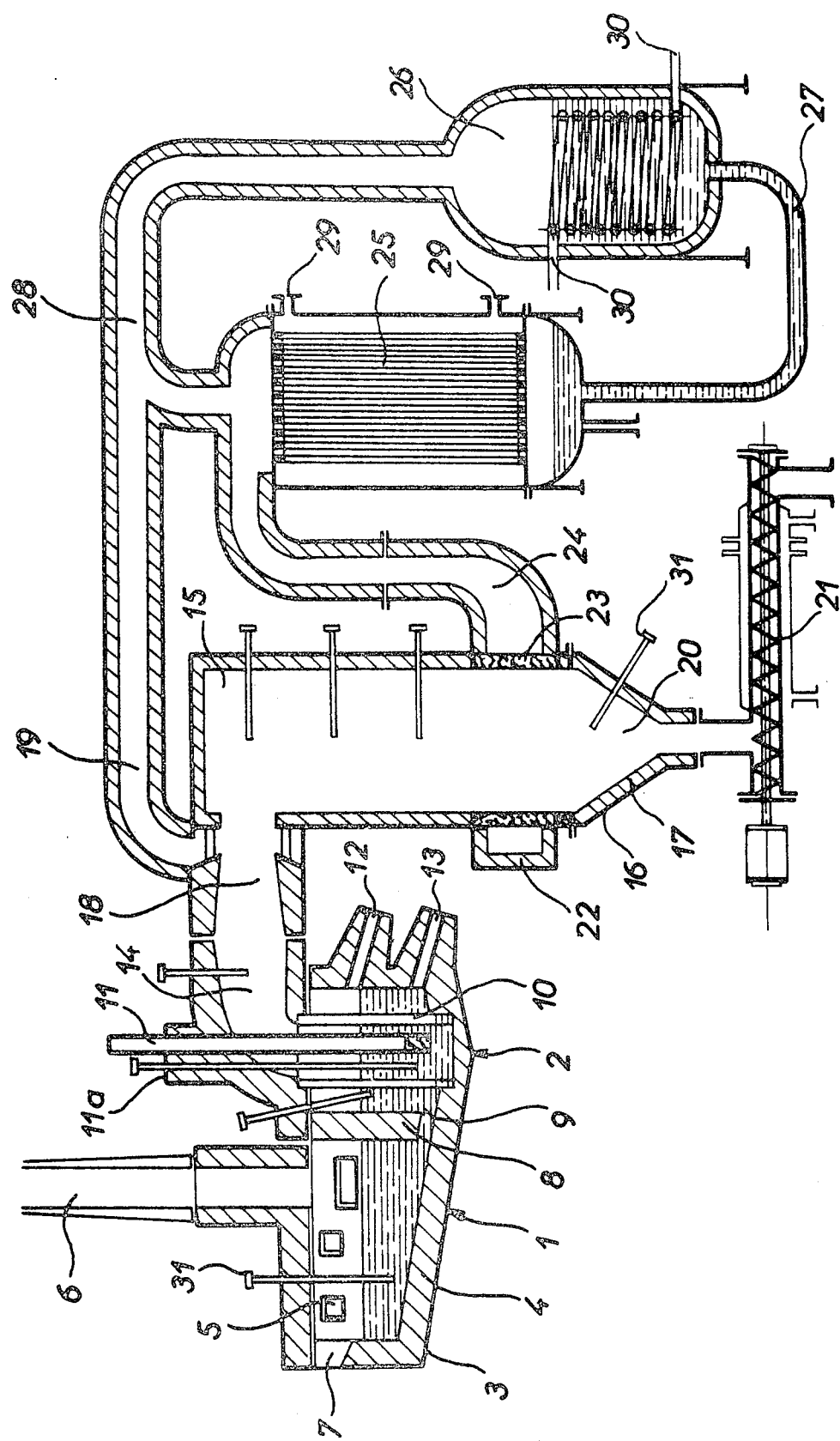

CONTINUOUSLY PRODUCING AND RECOVERING METALLIC CHLORIDES

The present invention relates to a method and apparatus for the continuous production and recovery of metal chlorides by processing an initial metallurgical product with gaseous chlorine.

It is known that the injection of gaseous chlorine into a molten metal or metalliferous bath is a technique which has many applications. For instance, in order to eliminate iron and cobalt contained in an impure nickel matte, this matte may be melted down under an appropriate slag and gaseous chlorine may be injected into the bath. The iron and cobalt are converted into the form of chlorides, as indeed is a part of the nickel, and they are recovered at the surface of the bath, in a liquid phase, in the form of a homogenous mixture with the slag. A process of this nature is described in our French Pat. No. 2,067,706.

Difficulties are however encountered if it is intended to recover the different chlorides of economic interest such as nickel chloride and cobalt chloride. As these are actually mixed with other chemical components originating from the slag, their separation is complex and difficult.

The injection of chlorine is equally applied to refine a molten metal, such as resmelted aluminum. This also entails the problem of recovery of those chlorides of high commercial value and, moreover, the use of a slag complicates the production of a pure metal for obvious reasons.

In neither case can the known process be applied in continuous manner, which imposes the need for very bulky and capital-intensive batch-operating plant.

Finally, as far as we know, known chlorination processes are applied in the presence of oxygen. Accordingly, there is risk of producing oxychlorides, with all the difficulties this entails during the subsequent hydrometallurgical processing of the metal chlorides produced. Also, the notorious pollutant sulphur dioxide is produced.

It would be desirable to provide a method for continuously producing and recovering metallic chlorides which could be applied (especially to nickel mattes) in continuous manner, with reduced drawbacks, and wherein when the metal is combined with sulphur in the initial product, the sulphur can be separated from the metal.

According to the invention, a method of continuously producing and recovering metallic chlorides comprises melting a stream of an incoming metallurgical product, conveying the melted product to a separate enclosure within which said product forms a pool, continuously injecting gaseous chlorine into the pool, maintaining the pool at a temperature such that at least one metal chloride is produced in the vapour phase, diluting the at least one chloride in a continuous flow of cooling gas whereof the temperature and rate of flow are such that the at least one chloride is condensed, collecting the condensed solid chloride and continuously cooling and recycling the cooling gas to dilute further quantities of chloride vapour.

In particularly advantageous embodiments of the invention, the cooling gas comprises sulphur in the vapour phase.

In this case, which is very appropriate for processing mattes, for example of nickel, that is for processing metal sulphides of greater or lesser purity, the process takes advantage of the low temperature of vaporization of metal chlorides, whereby the metal can be separated from the sulphur during condensation of the chloride vapour. Moreover, the chlorination and condensation stages are performed under an atmosphere of a gas consisting of sulphur vapour, which prevents any degradation of the products by secondary reactions.

The ingredients of a matte include various sulphides and metal in the free state. The chlorination reactions may be represented, in simplified manner, by the following equations:

1. $Me + Cl_2 \dashrightarrow MeCl_2$ (exothermic)
2. $MeS + Cl_2 \dashrightarrow MeCl_2 + S$ (exothermic)
3. $Me_xS_y + Cl_2 \dashrightarrow MeCl_2 + x'MeS_y$ -(exothermic)

The vapours produced during chlorination thus consist of a mixture of metal chlorides and sulphur. These vapours are then cooled in a continuous flow of cooling gas, in this case sulphur vapour, whereof the temperature and rate of flow are chosen to allow settling of condensed crystals of metal chlorides, which may then be collected.

The sulphur vapour thus separated from the chlorides is extracted from the condensation stage and continuously cooled and recycled. Preferably, the continuous cooling of the cooling gas comprises cooling the sulphur vapour until it condenses to a liquid, and then evaporating the liquid prior to recycling the evaporated liquid.

Since sulphur is extracted from the matte according to the reaction (2) above, the process produces pure sulphur, which is preferably drawn off in the liquid state between the condensation and vaporizing stages. The circulation of sulphur vapour is assured by this condensation-vaporisation arrangement. The rate of flow of sulphur vapour may be controlled by altering the rates of vaporization and of condensation.

This method may be applied, with little change, to continuous metal refining.

Cooling gas other than sulphur vapour can be used.

The present invention also seeks to provide an industrial plant in which the method described may be performed on an industrial scale and in continuous manner. Preferably, such a plant may be useful to chlorinate matte as well as to refine metals, with minor modifications.

A plant according to the invention therefore comprises a melting furnace with a continuous infeed device for metallurgical product, a chlorination chamber which is separated from the melting furnace by a baffle or barrier wall open only at its bottom, means for injecting chlorine gas into the chlorination chamber, which is equipped with a vapour discharge duct, a condensation chamber to which the vapour discharge duct leads, means for continuous feed of cooling gas to the condensation chamber, a container for collecting solid metal chlorides condensed in the condensation chamber, a duct for extracting the cooling gas from the condensation chamber, a cooler for the gas and means for recycling cooled gas to the condensation chamber.

At its base, the said condensation chamber preferably has the form of a hopper leading into an Archimedean screw of sealed construction for extraction of the metal chlorides produced from this chamber.

Equally for preference, the said means of performing continuous infeed of the cooling vapour into the condensation chamber comprise a feed duct opening radially into the vapour discharge duct close to the point at which this latter is connected to the condensation chamber.

The means of extracting the cooling gas from the condensation chamber advantageouly comprise an annular outflow orifice equipped with a porous filter.

In the case in which the cooling gas consists of sulphur vapour and wherein it is intended to purify a matte it is advantageous for the said means of cooling the cooling gas and of refeeding these into the condensation chamber to comprise, in series, a condenser connected to the said annular orifice, an evaporator and the said feed duct. The plant may then comprise, moreover, within the said chlorination chamber, an upright tubular element which is removable and of adjustable height, and which surrounds the means of injecting gaseous chlorine.

If it is intended to refine a metal, on the other hand, the chlorination chamber should be equipped with a taphole through which the metal refined can flow out constantly. In this case, the tubular element is removed from the chlorination chamber.

Finally, the plant in accordance with the invention advantageously comprises control elements whereof the input data consist of the temperatures detected by means of pyrometric probes positioned at different points of the plant. It is thus possible to control, among other things, the rate of infeed of the initial product into the smelting furnace, the rate of operation of this latter, the rate of chlorine flow and the speed of circulation of the cooling gas, which, in the case of sulphur vapour, may be adjusted by acting on their speed of condensation and of vaporization.

A continuous industrial production and fully automatic plant may thus be obtained.

The invention will now be described, purely by way of example, with reference to the accompanying drawing, which is a cross-section of a plant which may be used to perform a method according to the invention.

It will be assumed, for illustration, that a nickel matte is to be chlorinated, but the method and plant can be adapted, of course, for other metallurgical processings, such as the continuous refining of a metal by insufflation of gaseous chlorine into a molten bath of such metal.

The plant comprises means both to melt and chlorinate the matte, in particular, a melting furnace 1 and a reaction chamber 2 consisting of a common metal sheath 3 lined with refractory material 4. The furnace 1 is equipped with burners 5, with a chimney 6 for extraction of the combustion gases, and with a charging orifice 7.

The furnace 1 and reaction chamber 2 are separated by a baffle wall 8 of retractory material, which has a low-level orifice 9 allowing the metal from the melting furnace 1 to flow continuously to the reaction chamber 2 but not allowing interchange of gases between the furnace 1 and the reaction chamber 2. The chamber 2 is equipped centrally with a movable vertical tubular element 10 of refractory material, which is open at its lower end to molten metal and within which the matte is chlorinated. The element 10 is omitted if the processing operation envisaged is a continuous metal refining operation.

A vertical chlorine injection pipe 11 within the tubular element 10 passes through a top hermetic cover 11a through a stuffing-box which ensures sealing of the interior of the element 10 from the atmosphere and allows adjustment of the depth of immersion of the pipe 11 into the metal bath. The pipe 11 is connected to a source of chlorine, not illustrated, outside the plant. The pipe 11 could be replaced by any other chlorine injection device, for example a porous plug inserted into the base of the reaction chamber 2.

The chamber 2 also comprises a taphole 12 used in the continuous refining of metals, a drain hole 13 and a duct 14 for receiving vapours rising from the bath.

The duct 14 leads through a sealed device into a condensation chamber 15 for the chlorine and chloride vapours, which chamber is situated as close as possible to the reaction chamber 2 and is formed by a metal casing 16 lined with refractory material 17. This condensation chamber 15 comprises, at its upper end, an outer cylindrical space 18 into which open axially the duct 14 and radially a duct 19 for infeed of cooling gas (advantageously sulphur vapour in the case of nickel matte processing), and which itself opens axially into the chamber 15. The base of the chamber 15 forms a hopper 20 for reception of the chlorides condensed, connected to a gas-tight Archimedean screw 21 for removing these chlorides. The chamber 15 is encircled by an annular channel 22 with which it is in communication through a porous ceramic filter 23 to stop the chloride crystals from being entrained with the uncondensed vapour which is drawn off into the channel 22.

When processing a matte, the annular channel 22 is connected by a duct 24 to a conventional sulphur-vapour-condenser 25 which communicates via its base and a duct 27 with a conventional sulphur evaporator 26. The sulphur vapours generated by the evaporator 26, as well as those escaping from the top of the condenser 25, are recycled into the cylindrical annular space 18 by means of a duct 28 leading to the duct 19. The condenser 25 has a circulator 29 for a cooling medium and the evaporator 26 has a circulator 30 for a heating medium.

The plant described requires various measuring, checking and control appliances, of which only the pyrometric probes 31 have been illustrated. These pipes, by means of conventional control devices, render it possible in particular to act on the temperature of the furnace 1 by means of the output of the burners 5, and on the temperature in the condensation chamber 15 by means of the rate of delivery of the cooling vapours passing through the duct 19. It should be noted that this last temperature should be kept at a value such that it is only the vaporised chlorides which are condensed.

In the case of matte processing, the method of operation of this plant is as follows: the matte to be processed is fed into the furnace 1 through the charging orifice 7, wherein it is brought to a temperature in the region of 1200°C. It then passes continuously into the reaction chamber 2 wherein, within the tubular element 10, it reacts with chlorine fed in through the injection pipe 11. The chlorides produced, and sulphur, are vaporized and enter the condensation chamber 15 through the duct 14. It should be noted that, in this case, the taphole 12 is plugged and that there is no outflow of metal.

The output of the apparatus is determined by the charging infeed rate, and the injection of chlorine is controlled in such manner as to correspond to this rate or, more specifically, to the quantity of impurities to be eliminated from the matte per unit time. The required rate of chlorine flow can be readily calculated from the reactions specified supra and from analysis of the matte. The charging infeed rate is controllable by optional conventional means for continuous feed and metering.

Within the condensation chamber 15, the metal chlorides produced are cooled to close to 650°C by contact with the cooling gas from the duct 19. The chlorides are condensed and collected at the outflow extremity of the worm screw 21, for processing to recover the valuable metals they contain. For example, they may be dissolved in water, and the solution formed may, possibly after purification, be electrolyzed for depositing the metals on the cathode and for releasing at the anode chlorine, which may be recovered and recycled into the process.

The cooling gas is drawn off in continuous manner from the condensation chamber 15, and then cooled, and used again to cool further quantities of metal chlorides. In the preferred embodiment described, the cooling gas is sulphur vapour, which is cooled and liquefied at a temperature of approximately 440°C in the condenser 25. Still in continuous manner, the liquid sulphur passes into the evaporator 26 wherein it is again converted into sulphur vapour having a temperature close to 450°C and from which it is fed into the cylindrical annular space 18 to cool further quantities of metal chlorides.

Since sulphur is continuously produced by the matte chlorination reaction, a part of the liquid sulphur may be withdrawn from the circuit (for instance through withdrawing means on the condenser) and cast into "ingots".

The speed of circulation of the cooling vapours in the condensation chamber 15 is chosen to allow the metal chloride crystals to settle in the hopper 20. When using sulphur vapours, this speed may be controlled by varying the temperatures of the condenser 25 and of the evaporator 26. It is obviously possible to control these temperatures, and thus the speed of circulation, as a function of the temperature prevailing in the condensation chamber 15.

If it is now intended to refine a metal by means of chlorine, and no longer to chlorinate a matte, the movable tubular element 10 of the reaction chamber 2 is omitted and the taphole 12 is open permanently for the continuous outflow of the metal refined. The chlorine vapours produced are drawn off through the duct 14 and are processed just as for mattes.

What we claim is:

1. A method of continuously producing and recovering metallic chlorides, comprising melting an impure nickel matte in a melting zone, removing the melted product from the bottom of the melting zone, conveying the melted product to a separate chlorination zone sealed from the atmosphere, continuously injecting gaseous chlorine into the melted product in the chlorination zone, maintaining the melted product in the chlorination zone at a temperature such that at least one metal chloride is produced in the vapour phase, discharging the at least one metal chloride into a condensation zone, diluting and cooling the at least one metal chloride in the condensation zone in a continuous flow of cooling gas consisting of sulphur vapour at a temperature and rate of flow such that the temperature is lower than the melting point of the at least one metal chloride and the at least one metal chloride is thereby condensed, collecting the condensed metal chloride and continuously cooling and recycling the cooling gas to dilute and cool further quantities of chloride vapour.

2. A method as claimed in claim 1, wherein the continuous cooling of the cooling gas comprises cooling the sulphur vapour until it condenses to a liquid, and then evaporating the liquid prior to recycling the evaporated liquid.

3. A method as claimed in claim 2, wherein a portion of the sulphur coolant, corresponding to the amount of sulphur entering as matte, is removed prior to recycling.

* * * * *